United States Patent
Kotaki et al.

(10) Patent No.: US 7,641,721 B2
(45) Date of Patent: Jan. 5, 2010

(54) AQUEOUS SOLUTION OF CHROMIUM SALT AND METHOD FOR PRODUCING SAME

(75) Inventors: Hideki Kotaki, Yamaguchi (JP); Tomohiro Banda, Yamaguchi (JP); Takashi Hara, Yamaguchi (JP); Nobuo Takagi, Yamaguchi (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 377 days.

(21) Appl. No.: 10/578,626

(22) PCT Filed: Nov. 22, 2004

(86) PCT No.: PCT/JP2004/017353

§ 371 (c)(1),
(2), (4) Date: May 8, 2006

(87) PCT Pub. No.: WO2005/056478

PCT Pub. Date: Jun. 23, 2005

(65) Prior Publication Data

US 2007/0086938 A1    Apr. 19, 2007

(30) Foreign Application Priority Data

| Dec. 10, 2003 | (JP) | ............... 2003-412589 |
| Apr. 27, 2004 | (JP) | ............... 2004-132079 |
| May 12, 2004 | (JP) | ............... 2004-142871 |
| Sep. 6, 2004 | (JP) | ............... 2004-259046 |

(51) Int. Cl.
 *C23C 22/05* (2006.01)
 *C23C 30/00* (2006.01)
 *C23F 11/00* (2006.01)
 *C23F 11/12* (2006.01)
 *C01B 9/02* (2006.01)

(52) U.S. Cl. ............... 106/14.11; 106/14.13; 106/14.41; 106/14.44; 106/287.18; 106/453; 148/243; 148/252; 148/264; 148/267; 252/389.5

(58) Field of Classification Search .............. 106/14.11, 106/14.12, 14.13, 14.21, 14.41, 14.44, 287.18, 106/453; 148/243, 252, 267; 252/389.5, 252/264
See application file for complete search history.

(56) References Cited

U.S. PATENT DOCUMENTS

| 3,261,736 | A | * | 7/1966 | Eilerman .................... 156/167 |
| 4,528,175 | A | | 7/1985 | Walther et al. |

FOREIGN PATENT DOCUMENTS

| EP | 072493 | * | 8/1982 |
| EP | 1 484 432 A | | 12/2004 |
| JP | 54-020996 A | | 2/1979 |
| JP | 59-102821 A | | 6/1984 |
| JP | 60-180919 A | | 9/1985 |
| JP | 1-176227 A | | 7/1989 |
| JP | 1-176228 A | | 7/1989 |
| JP | 2-124721 A | | 5/1990 |
| JP | 9-195062 A | | 7/1997 |
| JP | 2000-178759 A | * | 6/2000 |
| JP | 2002-339082 A | | 11/2002 |
| JP | 2003-268562 A | | 9/2003 |
| JP | 2003-286584 A | | 10/2003 |

OTHER PUBLICATIONS

Machine Translation of JP2002-339082A (Nov. 2002).*

* cited by examiner

*Primary Examiner*—Anthony J Green
(74) *Attorney, Agent, or Firm*—Smith Patent Office

(57) ABSTRACT

Disclosed is an aqueous solution of a chromium salt, in which the oxalic acid content is 8% by weight or less relative to chromium. In the aqueous solution of the chromium salt, the total organic carbon content is 4% by weight or less relative to chromium. The chromium salt is preferably a chromium chloride, a chromium phosphate, or a chromium nitrate. The chromium chloride preferably contains a basic chromium chloride represented by the composition formula $Cr(OH)_xCl_y$ (wherein $0<x\leq2$, $1\leq y<3$, and $x+y=3$). The chromium phosphate is preferably one represented by the composition formula $Cr(H_{3-3/n}PO_4)_n$ (wherein n is a number satisfying $2\leq n\leq3$). The chromium nitrate is preferably a basic chromium nitrate represented by the composition formula $Cr(OH)_x(NO_3)_y$ (wherein $0<x\leq2$, $1\leq y<3$, and $x+y=3$).

6 Claims, No Drawings

AQUEOUS SOLUTION OF CHROMIUM SALT AND METHOD FOR PRODUCING SAME

TECHNICAL FIELD

The present invention relates to an aqueous solution of a chromium salt and a method for producing the same.

BACKGROUND ART

Among various aqueous solutions of chromium salts, aqueous solutions of chromium nitrate are known to be used as surface treatment agents for metals. Aqueous solutions of chromium phosphate are used as treatment solutions for forming chemical conversion coatings on zinc-plated surfaces of various metals, such as iron, nickel, and copper (refer to Patent Document 1).

In a known method for producing a chromium salt, such as chromium nitrate, chromium phosphate, or chromium chloride, ore is subjected to alkali oxidizing roasting to prepare a sodium dichromate solution, sulfuric acid is added to the sodium dichromate solution, which is then subsequently reduced with an organic substance to produce a chromium sulfate solution, caustic soda or soda ash is added thereto to form a precipitate of chromium hydroxide or chromium carbonate, which is subsequently subjected to filtration and water washing, and then nitric acid, phosphoric acid, or hydrochloric acid is added thereto for dissolution. In another known method, chromium ore is reduced in an electric furnace using a carbon reductant to produce high-carbon ferrochromium, the high-carbon ferrochromium is extracted with sulfuric acid, the resulting solution is electrolyzed to obtain metallic chromium, and nitric acid or hydrochloric acid is added to the metallic chromium to produce chromium nitrate or chromium chloride.

Furthermore, with respect to chromium nitrate, a production method is also known, which includes the steps of preparing a mixed solution of chromium trioxide and nitric acid by mixing nitric acid with chromium trioxide in a stoichiometric amount required to produce chromium nitrate or more, and adding an excessive amount of an organic reducing agent composed of an alcohol, an aldehyde, or a carboxylic acid, which is derived from a carbohydrate selected from monosaccharides, disaccharides, and starches, or a mixture of these, to the mixed solution of chromium trioxide and nitric acid prepared in the previous step to reduce chromium trioxide, thereby producing chromium nitrate (for example, refer to Patent Document 2).

With respect to chromium chloride, the present applicant has proposed a method in which an aqueous solution of chromic acid is allowed to react with an organic reducing agent capable of substantially completely decomposing into carbon dioxide gas and water by reaction with hydrochloric acid and chromic acid, thereby producing a high-purity aqueous solution of chromium chloride (for example, refer to Patent Document 3).

Among known methods, in the method in which chromium hydroxide is dissolved in nitric acid, it is very difficult to perform water washing of the precipitate of chromium hydroxide produced by adding caustic soda or soda ash to chromium sulfate, and it is not possible to remove impurities, such as sodium and sulfate salts, in chromium hydroxide. This problem remains to be solved.

In the method according to Patent Document 2, for example, mixing of nitric acid with chromium trioxide in a stoichiometric amount required to produce chromium nitrate or more is effective in decreasing the amount of hexavalent chromium. However, depending on the conditions, the added reducing agent may react with nitric acid instead of chromium trioxide, resulting in generation of NOx. Consequently, not only a de-NOx system may be required, but also sudden reaction may cause dangerous conditions.

Patent Document 1: Japanese Unexamined Patent Application Publication No. 2003-268562

Patent Document 2: Japanese Unexamined Patent Application Publication No. 2002-339082

Patent Document 3: Japanese Unexamined Patent Application Publication No. 1-176227

DISCLOSURE OF INVENTION

Accordingly, it is an object of the present invention to provide an aqueous solution of a chromium salt and a method for producing the same, which can overcome the various disadvantages associated with the known techniques described above.

In the present invention, the object described above is achieved by providing an aqueous solution of a chromium salt which is characterized in that the oxalic acid content is 8% by weight or less relative to chromium.

BEST MODE FOR CARRYING OUT THE INVENTION

The present invention will be described below by way of its preferred embodiments. An aqueous solution of a chromium salt of the present invention is characterized in that the level of oxalic acid, which is an organic substance, is low. More particularly, if the level of oxalic acid is low, it has been found that when an aqueous solution of a chromium salt of the present invention is used for surface treatment of metal, a product with a highly glossy finish can be obtained. In the technique according to Patent Document 2 described above, in order to reduce hexavalent chromium, an organic reducing agent having a large number of carbon atoms, such as starch or glucose, is used, and as a result, the level of oxalic acid present in the aqueous solution is higher than that of the present invention.

The oxalic acid content in an aqueous solution of a chromium salt of the present invention is 8% by weight or less, preferably 6% by weight or less, and more preferably 4% by weight or less, relative to chromium. Furthermore, preferably, oxalic acid is not substantially contained in the aqueous solution of the chromium salt. The oxalic acid content can be measured, for example, by ion chromatography. The lower limit of the oxalic acid content in the aqueous solution of the chromium salt of the present invention is not particularly limited. An extremely low level, i.e., substantially no content, of oxalic acid can be achieved using a production method that will be described below.

The aqueous solution of the chromium salt of the present invention is also characterized in that the level of total organic carbon (hereinafter also referred to as "TOC") is low. As a result of research by the present inventors, it has been found that if the TOC level is low in addition to the low level of oxalic acid described above, when the aqueous solution of the chromium salt of the present invention is used as a surface treatment agent for metal, a product with a more highly glossy finish can be obtained.

The term "TOC" refers to the total amount of C remaining as organic substances in the solution. In the aqueous solution of the chromium salt of the present invention, the TOC level is low preferably at 4% by weight or less, and more preferably at 2% by weight or less, relative to chromium. Patent Document 2 describes that 0.3% by weight or more of TOC is required in an aqueous solution of chromium nitrate in order to ensure that hexavalent chromium is reduced to trivalent chromium. However, as a result of detailed research on the TOC conducted by the present inventors, it has been found that if the TOC content is increased, when the aqueous solution of the chromium salt is used as a surface treatment agent for metal, a satisfactory glossy finish cannot be obtained. If an aqueous solution of a chromium salt of the present invention is produced by the method that will be described below, even if the TOC level is low, hexavalent chromium can be reliably eliminated. The lower limit of the TOC level in the aqueous solution of the chromium salt of the present invention is not particularly limited. If the production method described below is used, extremely low levels can be achieved, for example, 0.5% by weight in the case of chromium chloride, 0.5% by weight in the case of chromium phosphate, and 0.1% by weight in the case of chromium nitrate.

The TOC in the aqueous solution of the chromium salt of the present invention can be measured, for example, with a total organic carbon analyzer Model TOC 500 manufactured by Shimadzu Corporation.

In the aqueous solution of the chromium salt of the present invention, in spite of the fact that the oxalic acid content is low and the TOC level is preferably low, substantially no hexavalent chromium is present in the aqueous solution. Consequently, the aqueous solution of the chromium salt of the present invention is advantageous in that the environmental load is low. Such an aqueous solution is suitably produced by the production method described below.

Typical examples of the chromium salt of the present invention include, but are not limited to, a chromium chloride, a chromium nitrate, and a chromium phosphate.

When the chromium salt of the present invention is a chromium chloride, an aqueous solution of chromium chloride includes a compound represented by the composition formula: $Cr(OH)_xCl_y$ (wherein $0 \leq x \leq 2$, $1 \leq y \leq 3$, and $x+y=3$). The concentration of the aqueous solution of chromium chloride of the present invention is, in many cases, 25% by weight or more, and preferably 35% by weight or more, in terms of $CrCl_3$. If the concentration exceeds 41% by weight, crystals may be precipitated depending on the conditions. Examples of the compound represented by the above-mentioned composition formula include, in addition to a chromium chloride represented by $CrCl_3$, a basic chromium chloride, which is a compound obtained by replacing the chlorine partially with the hydroxyl group, i.e., a compound represented by the above-mentioned composition formula, wherein $0<x\leq2$, $1\leq y<3$, and $x+y=3$. Examples of the basic chromium chloride include $Cr(OH)_{0.5}Cl_{2.5}$, $Cr(OH)Cl_2$, and $Cr(OH)_2Cl$. Hereinafter, the term "chromium chloride" may mean a chromium chloride represented by $CrCl_3$ or a basic chromium chloride depending on the context. In some cases, both may be collectively referred to as "chromium chloride".

The compounds represented by the composition formula may be present alone or in any combination of two or more in the aqueous solution of chromium chloride of the present invention. By combining two or more, solutions that are suitable in specific applications can be prepared.

In the above-mentioned composition formula, when $x=0$ and $y=3$, the specific gravity at 20° C. of the aqueous solution of chromium chloride of the present invention is preferably 1.25 to 1.46.

On the other hand, when the chromium chloride aqueous solution of the present invention is an aqueous solution of basic chromium chloride, the specific gravity at 20° C. of the aqueous solution is preferably 1.35 to 1.44, and more preferably 1.40 to 1.44. If the specific gravity of the aqueous solution is in this range, disproportionation does not occur in the liquid even if stored for a long period of time, and crystals of chromium chloride are not easily precipitated, thus being preferable. In order to set the specific gravity in the range described above, for example, as will be described below, the molar ratio (Cl/Cr) of chlorine to chromium may be set to be 1 or more and less than 3.

In the aqueous solution of basic chromium chloride, the molar ratio (Cl/Cr) of chlorine to chromium in the basic chromium chloride is preferably 1 or more and less than 3. If the molar ratio is in this range, crystals of chromium chloride do not easily occur. In the present invention, the specific gravity and the molar ratio of chlorine to chromium are important factors in preventing crystallization of chromium chloride more effectively.

In order to set the molar ratio of chlorine to chromium in the basic chromium chloride in the range described above, for example, the production method that will be described below may be used.

The concentration of basic chromium chloride in the aqueous solution of basic chromium chloride is appropriately adjusted in accordance with the intended specific application. In general, the concentration in terms of Cr is preferably 8.2% by weight or more, and particularly preferably 11.4% by weight or more. The upper limit of the concentration is not particularly limited, but is preferably 14% by weight, and particularly preferably about 13.5%. The concentration of basic chromium chloride can be easily adjusted by addition of dilution water, such as ion-exchanged water or pure water. Consequently, the aqueous solution of basic chromium chloride of the present invention is advantageous in that the concentration of chromium chloride can be freely adjusted depending on the intended use.

When the chromium salt of the present invention is a chromium nitrate, an aqueous solution of chromium nitrate includes a compound represented by the composition formula: $Cr(OH)_x(NO_3)_y$ (wherein $0\leq x\leq 2$, $1\leq y\leq 3$, and $x+y=3$). The concentration of the aqueous solution of chromium nitrate of the present invention is, in many cases, 25% by weight or more, and preferably 35% by weight or more, in terms of $Cr(NO_3)_3$. If the concentration exceeds 41% by weight, crystals may be precipitated depending on the conditions. Examples of the compound represented by the above-mentioned composition formula include, in addition to a chromium nitrate represented by $Cr(NO_3)_3$, a basic chromium nitrate, which is a compound obtained by replacing the nitrate group partially with the hydroxyl group. Examples of the basic chromium nitrate include $Cr(OH)_{0.5}(NO_3)_{2.5}$, $Cr(OH)(NO_3)_2$, and $Cr(OH)_2(NO_3)$.

The compounds represented by the above-mentioned composition formula may be present alone or in any combination of two or more in the aqueous solution of chromium nitrate of the present invention. By combining two or more, solutions that are suitable in specific applications can be prepared.

When the chromium salt of the present invention is a chromium phosphate, an aqueous solution of chromium phosphate includes a chromium phosphate (e.g., chromium biphosphate) represented by the composition formula: $Cr(H_{3-3/n}PO_4)_n$ (wherein n is a number satisfying $2\leq n\leq 3$). Examples of the chromium phosphate represented by the above-mentioned composition formula include, in addition to $Cr(H_2PO_4)_3$, $Cr(H_{1.5}PO_4)_2$, and $Cr(H_{1.8}PO_4)_{2.5}$.

The compounds represented by the above-mentioned composition formula may be present alone or in any combination of two or more in the aqueous solution of chromium phosphate of the present invention. By combining two or more, solutions that are suitable in specific applications can be prepared.

Hexavalent chromium compounds are corrosive and oxidizing, and therefore, in aqueous solutions of chromium salts prepared using these compounds as starting materials, large amounts of impurity metal ions, in particular, Na and Fe, are inevitably mixed. In contrast, the aqueous solution of the chromium salt of the present invention is characterized in that the content of these ions is extremely low. When such a high-purity aqueous solution of a chromium salt is used, in particular, as a starting material for a chromium catalyst in the production of chromium hydroxide, high-purity chromium hydroxide is advantageously obtained, which is preferable. The concentration of impurity metal ions is measured, for example, using ICP-AES.

With respect to the concentration of impurity metal ions in the aqueous solution of the chromium salt, the Na level is low preferably at 30 ppm or less, and more preferably at 20 ppm or less. The Fe concentration is preferably 20 ppm or less, and more preferably 10 ppm or less. Note that when the chromium salt is a chromium chloride, the concentration is calculated on the basis of 40% by weight in terms of $CrCl_3$. When the chromium salt is a chromium nitrate, the concentration is calculated on the basis of 40% by weight in terms of $Cr(NO_3)_3$. When the chromium salt is a chromium phosphate, the concentration is calculated on the basis of 40% by weight in terms of $Cr(H_2PO_4)_3$.

In addition to the extremely low content of impurity metal ions, the aqueous solution of the chromium salt of the present invention is also characterized in that the content of impurity anions, in particular, chloride ions and sulfate ions, is extremely low. Above all, with respect to the aqueous solution of chromium phosphate, the level of impurity anions in the aqueous solution is low. Namely, the Cl content is preferably 10 ppm or less, and more preferably 5 ppm or less. The $SO_4$ content is preferably 100 ppm or less, and more preferably 50 ppm or less.

The aqueous solution of the chromium salt of the present invention is also characterized in that the solution contains substantially no free counter-ions not bonded with Cr, for example, chlorine ions and nitrate ions. The fact that substantially no free counter-ions are contained is preferable because precipitation of crystals can be advantageously suppressed when the aqueous solution of the chromium salt of the present invention in high concentration is stored for a long period of time. The term "high concentration" refers to the concentration of 40% of $Cr(NO_3)_3$, for example, when the chromium salt is a chromium nitrate.

The aqueous solution of the chromium salt of the present invention can be preferably used, for example, in applications of surface treatment of metal and catalysts. In particular, when used for surface treatment of metal, a product with a highly glossy finish is advantageously obtained.

Preferred methods for producing an aqueous solution of a chromium salt according to the present invention will now be described. First, a preferred method for producing an aqueous solution of chromium chloride, as an example of the aqueous solution of the chromium salt of the present invention, will be described. The production method includes adding an organic reducing agent to an aqueous solution of chromic acid to reduce part of the chromic acid in advance in the first stage of reaction, and then mixing hydrochloric acid and the organic reducing agent and adding the mixture to the reaction solution to complete the reaction.

First, the aqueous solution of chromic acid, which is a raw material, is prepared, for example, by a process in which sodium chromate obtained by alkali oxidizing roasting of chromium ore is used as a starting material and subjected to various purification steps to produce chromium trioxide, and the resulting chromium trioxide is dissolved in water. In the aqueous solution of chromic acid thus prepared, the content of impurities, such as Fe, Na, Mg, Al, Ca, Ni, Mo, and W, is extremely low compared with that of an aqueous solution of chromic acid prepared using, as a raw material, chromium hydroxide or chromium carbonate obtained by adding caustic soda or soda ash to chromium sulfate, or an aqueous solution of chromic acid prepared by dissolving high-carbon ferrochromium in nitric acid or hydrochloric acid.

The aqueous solution of chromic acid must be a solution in the reaction system, and at the initial stage of reaction, chromium trioxide may be used. However, in many cases, water is added thereto for dissolution, and the resulting aqueous solution is used. The concentration of the aqueous solution of chromic acid is not particularly limited, but is preferably in a general range of 20% to 60% by weight.

The organic reducing agent to be added to the aqueous solution of chromic acid is not particularly limited as long as it substantially completely decomposes into carbon dioxide gas and water in the reduction reaction, which will be described below. Examples of the organic reducing agent that may be suitably used include monohydric alcohols, such as methanol; and dihydric alcohols, such as ethylene glycol and trimethylene glycol. Other examples of the organic reducing agent include monosaccharides, such as glucose; disaccharides, such as maltose; and polysaccharides, such as starch. However, if saccharides having a large number of carbon atoms are used, organic decomposition products tend to remain, and it is not easy to decrease the oxalic acid content. It is also not easy to decrease the level of TOC containing oxalic acid. Therefore, in this production method, a monohydric or dihydric alcohol, which is a reducing agent capable of easily suppressing generation of oxalic acid and decreasing the TOC level, is preferably used. Use of a monohydric or dihydric alcohol is also advantageous in that a substantially stoichiometric reduction reaction is easily carried out. From these standpoints, a lower alcohol (e.g., an alcohol having 4 or less carbon atoms), in particular, methanol, ethylene glycol, or trimethylene glycol, is preferably used, and in particular, methanol is preferably used.

The organic reducing agent may be directly added without dilution to the aqueous solution of chromic acid, or may be diluted with water before addition. When the organic reducing agent is diluted with water, preferably, the concentration of the organic reducing agent is set at about 10% to 30% by weight in view of operationality and controllability of reaction.

As the hydrochloric acid to be added to the aqueous solution of chromic acid together with the organic reducing agent, hydrochloric acid for industrial use can be used, and either synthetic hydrochloric acid or by-product hydrochloric acid may be used. Hydrochloric acid with a concentration of 35% by weight and a specific gravity of 1.15 is usually used, although not limited thereto. For the purpose of the present invention, these various starting materials are preferably used in concentrations as high as possible.

In the first stage of reaction, the organic reducing agent is added to the aqueous solution of chromic acid to reduce part of the chromic acid in advance, and then hydrochloric acid and the organic reducing agent are mixed and added to the aqueous solution of chromic acid. The rate of addition in each step is not particularly limited. In a method in which an acid and an aqueous solution of chromic acid are mixed in advance and then an organic reducing agent is added thereto, such as the method described in Patent Document 2, during the production of chromium chloride, as the temperature increases due to reaction heat of oxidation-reduction reaction, chromyl chloride is generated, which is dangerous.

When methanol is for example used as the organic reducing agent, the reaction formula in this production method is as follows:

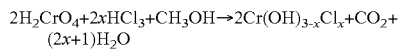
$$2H_2CrO_4 + 2xHCl_3 + CH_3OH \rightarrow 2Cr(OH)_{3-x}Cl_x + CO_2 + (2x+1)H_2O$$

(wherein x is a number in the range of 0 to 3).

As shown in the reaction formula, on the assumption that a is the theoretical amount (stoichiometric amount) of hydrochloric acid required for converting chromic acid to chromium chloride and b is the theoretical amount (stoichiometric amount) of the organic reducing agent required for reducing chromic acid, preferably, the relationship a<b is always maintained during the addition of the reducing agent. As described above, the addition is performed by the method in which the organic reducing agent is added to reduce part of the chromic acid in advance in the first stage of reaction and then a mixed solution of hydrochloric acid and the reducing agent is added. In this method of addition, a high level of control is not required and the relationship a<b can be always maintained. Thus, the method is preferable in view of operationality. Thereby, an advantageous effect is obtained that chromyl chloride is prevented from being generated because of reaction of chromic acid and hydrochloric acid that is not bonded with trivalent chromium.

Addition of the organic reducing agent to the aqueous solution of chromic acid initiates oxidation-reduction reaction. The reaction rapidly proceeds accompanied by generation of a considerable amount of heat. The reaction temperature is usually 90° C. to 110° C. The generated steam is cooled and refluxed to the reaction system by a condenser.

When an aqueous solution of basic chromium chloride is produced, hydrochloric acid is added in an amount of 1 mole equivalent to less than 3 mole equivalents based on the chromic acid.

After the reaction is completed, aging is performed for a short period of time, and the resulting product can be used as a finished product. Preferably, the aging is performed for 30 minutes or more and at 90° C. to 110° C. The main purposes of the aging process are to decrease $Cr^{6+}$ present in the solution to substantially zero and to set the oxalic acid content at 8% by weight or less relative to chromium. As necessary, the organic reducing agent is further added to completely reduce remaining $Cr^{6+}$. Furthermore, hydrochloric acid may be added as necessary to fine-adjust the molar ratio of chromium ions to chlorine ions.

A preferred method for producing an aqueous solution of chromium phosphate, as another example of the aqueous solution of the chromium salt of the present invention, will now be described. With respect to the items not particularly mentioned in this production method, those described regarding the production method of chromium chloride are appropriately applied. This production method is characterized in that phosphoric acid and at least one organic reducing agent selected from monohydric alcohols and dihydric alcohols are added to an aqueous solution of chromic acid.

The order of addition of phosphoric acid (orthophosphoric acid) and the organic reducing agent to the aqueous solution of chromic acid is not particularly limited. For example, phosphoric acid and the organic reducing agent may be added simultaneously and separately. Alternatively, phosphoric acid may be mixed with the organic reducing agent, and the mixture may be added to the aqueous solution of chromic acid. Preferably, phosphoric acid is mixed with the aqueous solution of chromic acid in advance to increase the acidity in the reaction system, and then the organic reducing agent is added. Thereby, generation of oxalic acid can be further suppressed. As the phosphoric acid (orthophosphoric acid), phosphoric acid for industrial use can be used. Phosphoric acid with a concentration of 75% by weight or more is usually used, although not limited thereto. For the purpose of the present invention, these various starting materials are preferably used in concentrations as high as possible.

When ethylene glycol is for example used as the organic reducing agent, the reaction formula in this production method is as follows:

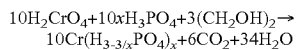
$$10H_2CrO_4 + 10xH_3PO_4 + 3(CH_2OH)_2 \rightarrow 10Cr(H_{3-3/x}PO_4)_x + 6CO_2 + 34H_2O$$

(wherein x is a number satisfying $2 \leq x \leq 3$).

Addition of the organic reducing agent to the mixed aqueous solution of chromic acid and phosphoric acid initiates oxidation-reduction reaction. The reaction rapidly proceeds accompanied by generation of a considerable amount of heat. The reaction temperature is usually 90° C. to 110° C. The generated steam is cooled and refluxed to the reaction system by a condenser.

After the reaction is completed, aging is performed for a short period of time, and the resulting product can be used as a finished product. Preferably, the aging is performed for 30 minutes or more and at 90° C. to 110° C. The main purposes of the aging process are to decrease $Cr^{6+}$ present in the solution to substantially zero and to set the oxalic acid content at 8% by weight or less relative to chromium. As necessary, the organic reducing agent is further added to completely reduce remaining $Cr^{6+}$. Furthermore, phosphoric acid may be added as necessary to fine-adjust the molar ratio of chromium ions to phosphate ions.

A preferred method for producing an aqueous solution of chromium nitrate, as another example of the aqueous solution of the chromium salt of the present invention, will now be described. With respect to the items not particularly mentioned in this production method, those described regarding the production methods of chromium chloride and chromium phosphate are appropriately applied. This production method is characterized in that nitric acid and an organic reducing agent are separately and simultaneously added to an aqueous solution of chromic acid.

As the nitric acid to be added to the aqueous solution of chromic acid together with the organic reducing agent, nitric acid for industrial use can be used, and either synthetic nitric acid or by-product nitric acid may be used. Nitric acid with a concentration of 67.5% by weight and a specific gravity of 1.4 is usually used, although not limited thereto. For the purpose of the present invention, these various starting materials are preferably used in concentrations as high as possible.

Nitric acid and an organic reducing agent are simultaneously and separately added to an aqueous solution of chromic acid. The rate of addition of each of nitric acid and the organic reducing agent is not particularly limited. The term "separately" means that nitric acid and the organic reducing agent are added not in a mixed state. When the organic reducing agent and nitric acid are mixed, both react with each other to generate NOx, thus being dangerous. Furthermore, as in the method according to Patent Document 2, if a reducing agent is added to a mixed solution of nitric acid and chromic acid, depending on the conditions, the added reducing agent may react with nitric acid instead of chromic acid, resulting in generation of NOx. Consequently, not only a de-NOx system may be required, but also sudden reaction may cause dangerous conditions.

When methanol is for example used as the organic reducing agent, the reaction formula in this production method is as follows:

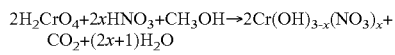

$2H_2CrO_4 + 2xHNO_3 + CH_3OH \rightarrow 2Cr(OH)_{3-x}(NO_3)_x + CO_2 + (2x+1)H_2O$ (wherein x is a number in the range of 0 to 3).

As shown in the reaction formula, on the assumption that a is the theoretical amount (stoichiometric amount) of nitric acid required for converting chromic acid to chromium nitrate and b is the theoretical amount (stoichiometric amount) of the organic reducing agent required for reducing chromic acid, preferably, the relationship a<b is always maintained during the simultaneous and separate addition of nitric acid and the organic reducing agent. Thereby, an advantageous effect is obtained that NOx is prevented from being generated because of reaction of the reducing agent and nitric acid that is not bonded with trivalent chromium. With respect to the relationship between a and b, more preferably, the ratio a/b is less than 1, and particularly preferably 0.9 or less.

Addition of nitric acid and the organic reducing agent to the aqueous solution of chromic acid initiates oxidation-reduction reaction. The reaction rapidly proceeds accompanied by generation of a considerable amount of heat. The reaction temperature is usually 90° C. to 110° C. The generated steam is cooled and refluxed to the reaction system by a condenser.

In this method, prior to the simultaneous and separate addition of nitric acid and the organic reducing agent, preferably, only the organic reducing agent is added to the aqueous solution of chromic acid. The reason for this is that by allowing the addition of the organic reducing agent to precede and completing the addition of nitric acid after the addition of the organic reducing agent is completed, the ratio a/b in the reaction system can always be set in the range described above.

Under the condition in which the organic reducing agent is being added to the aqueous solution of chromic acid first, nitric acid is also added. Thus, both are simultaneously and separately added.

After the reaction is completed, aging is performed for a short period of time, and the resulting product can be used as a finished product. Preferably, the aging is performed for 30 minutes or more and at 90° C. to 110° C. The main purposes of the aging process are to decrease $Cr^{6+}$ present in the solution to substantially zero and to set the oxalic acid content at 8% by weight or less relative to chromium. As necessary, the organic reducing agent is further added to completely reduce remaining $Cr^{6+}$. Furthermore, nitric acid may be added as necessary to fine-adjust the molar ratio of chromium ions to nitrate ions.

In the various aqueous solutions of chromium salts produced by the respective production methods described above, the oxalic acid level is low, and substantially no hexavalent chromium is present. As necessary, the resulting aqueous solutions of chromium salts are subjected to heat concentration, and then are cooled to obtain crystals of chromium salts. In the resulting chromium salts, the oxalic acid content is low at 2% by weight or less relative to chromium, and preferably substantially no oxalic acid is contained. Furthermore, hexavalent chromium is not substantially contained.

In the heat concentration, water in the aqueous solutions of chromium salts is removed. The heat concentration may be performed after the reaction is completed or during the reaction. When the heat concentration is performed during the reaction, a process may be employed in which the steam generated is condensed by a condenser, and the resulting water is extracted from the reaction system. This process is efficient and industrially advantageous.

EXAMPLES

The present invention will be described in detail by way of examples below. Unless otherwise indicated, "%" means "% by weight".

Example 1-1

To a glass reactor equipped with a condenser, 251.6 g of water was fed and 253.1 g of chromium trioxide was further added thereto, followed by thorough stirring for dissolution, to prepare a 50% aqueous solution of chromic acid. Methanol was used as a reducing agent. In the first stage of reaction, a 20% aqueous solution of methanol prepared by adding 48.4 g of water to 12.2 g of 99.5% methanol was added to the aqueous solution of chromic acid using a metering pump at a rate of 1.0 g/min. This rate of addition allows 60.6 g of the 20% aqueous solution of methanol to be added in about one hour. Also note that 12.2 g of 99.5% methanol corresponds to a volume that reduces 30% of the chromic acid.

After the addition of the reducing agent was completed in the first stage, 817.9 g of a mixed solution of 28.4 g of 99.5% methanol and 789.5 g of 35% hydrochloric acid was added thereto at a rate of 6.8 g/min. This rate of addition allows 817.9 g of the mixed solution of methanol and hydrochloric acid to be added in 2 hours. During the reaction, 327.7 g of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and the aqueous solution of methanol was added. Aging was further continued. Disappearance of color of $Cr^{6+}$ was confirmed by a diphenylcarbazide method, which will be described below, and thus the reaction was considered to be complete. During the reaction, generation of chromyl chloride was not observed. The composition of the resulting aqueous solution of chromium chloride was as shown below.

<Process for Detecting Hexavalent Chromium Using Diphenylcarbazide Method>

A small amount of the reaction solution was placed in a watch glass, 3 to 5 drops of (1+5)sulfuric acid were added, and diphenylcarbazide was added dropwise thereto. The time point when no discoloration to red-violet had occurred was regarded as the end point of reduction reaction.

TABLE 1

| | |
|---|---|
| $CrCl_3$ | 40.5% |
| Cr | 13.3% |
| Cl | 27.2% |
| Cl/Cr molar ration | 3.00 |
| Specific granity | 1.44 |
| $Cr^{6+}$ | Not detected |
| Oxalic acid(relative to Cr) | Not detected |
| TOC(relative to Cr) | 0.5% |
| Fe | 6 ppm |
| Na | 20 ppm |
| Cu | Not detected |

Example 1-2

To a glass reactor equipped with a condenser, 420.6 g of a 60% aqueous solution of chromic acid and 84.1 g of water were fed, followed by thorough stirring, to prepare a 50% aqueous solution of chromic acid. Ethylene glycol was used as a reducing agent. In the first stage of reaction, a 20% aqueous solution of ethylene glycol prepared by adding 56.2 g of water to 14.3 g of 98.5% ethylene glycol was added to the aqueous solution of chromic acid using a metering pump at a rate of 1.2 g/min. This rate of addition allows 70.5 g of the 20% aqueous solution of ethylene glycol to be added in about one hour. Also note that 14.3 g of 98.5% ethylene glycol corresponds to a volume that reduces 30% of the chromic acid.

After the addition of the reducing agent was completed in the first stage, 822.9 g of a mixed solution of 33.4 g of 98.5% ethylene glycol and 789.5 g of 35% hydrochloric acid was added thereto at a rate of 6.9 g/min. This rate of addition allows 822.9 g of the mixed solution of ethylene glycol and hydrochloric acid to be added in 2 hours. During the reaction, 331.5 g of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and the aqueous solution of ethylene glycol was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 2

| | |
|---|---|
| $CrCl_3$ | 40.5% |
| Cr | 13.3% |
| Cl | 27.4% |
| Cl/Cr molar ration | 3.02 |
| Specific granity | 1.44 |
| $Cr^{6+}$ | Not detected |
| Oxalic acid(relative to Cr) | 1.5% |
| TOC(relative to Cr) | 0.8% |
| Fe | 5 ppm |
| Na | 18 ppm |
| Cu | Not detected |

Example 1-3

To a glass reactor equipped with a condenser, 420.6 g of a liquid chromic acid 60% solution and 151.1 g of water were fed, followed by thorough stirring, to prepare a 44% aqueous solution of chromic acid. As a reducing agent, 99.5% methanol was used. In the first stage of reaction, a 20% aqueous solution of methanol prepared by adding 48.4 g of water to 12.2 g of 99.5% methanol was added to the aqueous solution of chromic acid using a metering pump at a rate of 1.0 g/min. This rate of addition allows 60.6 g of the 20% aqueous solution of methanol to be added in about one hour. Also note that 12.2 g of 99.5% methanol corresponds to a volume that reduces 30% of the chromic acid.

After the addition of the reducing agent was completed in the first stage, 423.2 g of a mixed solution of 28.4 g of 99.5% methanol and 394.8 g of 35% hydrochloric acid was added thereto at a rate of 3.5 g/min. This rate of addition allows 423.2 g of the mixed solution of methanol and hydrochloric acid to be added in 2 hours. After the addition of the mixed solution of the reducing agent and hydrochloric acid was completed, aging was continued for 30 minutes. The temperature in this process was 105° C. After aging, remaining $Cr^{6+}$ was checked, and the aqueous solution of methanol was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 3

| | |
|---|---|
| $Cr(OH)_{1.5}Cl_{1.5}$ | 33.3% |
| Cr | 13.2% |
| Cl | 13.6% |
| Cl/Cr molar ration | 1.51 |
| Specific granity | 1.36 |
| $Cr^{6+}$ | Not detected |
| Oxalic acid(relative to Cr) | Not detected |
| TOC(relative to Cr) | 1.7% |
| Fe | 6 ppm |
| Na | 20 ppm |
| Cu | Not detected |

Example 1-4

To a glass reactor equipped with a condenser, 256.0 g of water was fed, and 256.0 g of chromium trioxide was further added thereto, followed by thorough stirring for dissolution, to prepare a 50% aqueous solution of chromic acid. As a reducing agent, 98.5% ethylene glycol was used. In the first stage of reaction, a 27% aqueous solution of ethylene glycol prepared by adding 38.9 g of water to 15.0 g of 98.5% ethylene glycol was added to the aqueous solution of chromic acid using a metering pump at a rate of 0.9 g/min. This rate of addition allows 53.9 g of the 27% aqueous solution of ethylene glycol to be added in about one hour. Also note that 15.0 g of 98.5% ethylene glycol corresponds to a volume that reduces 31% of the chromic acid.

After the addition of the reducing agent was completed in the first stage, 433.0 g of a mixed solution of 33.3 g of 98.5% ethylene glycol and 399.7 g of 35% hydrochloric acid was added thereto at a rate of 3.6 g/min. This rate of addition allows 433.0 g of the mixed solution of ethylene glycol and hydrochloric acid to be added in 2 hours. After the addition of the mixed solution of the reducing agent and hydrochloric acid was completed, aging was continued for 30 minutes. The temperature in this process was 105° C. After aging, remaining $Cr^{6+}$ was checked, and the aqueous solution of ethylene glycol was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 4

| | |
|---|---|
| $Cr(OH)_{1.5}Cl_{1.5}$ | 35.2% |
| Cr | 14.0% |
| Cl | 16.0% |
| Cl/Cr molar ration | 1.68 |
| Specific granity | 1.39 |
| $Cr^{6+}$ | Not detected |
| Oxalic acid(relative to Cr) | 2.9% |
| TOC(relative to Cr) | 2.9% |
| Fe | 8 ppm |
| Na | 22 ppm |
| Cu | Not detected |

Example 1-5

To a glass reactor equipped with a condenser, 420.6 g of a liquid chromic acid 60% solution and 84.1 g of water were fed, followed by thorough stirring, to prepare a 50% aqueous solution of chromic acid. As a reducing agent, 99.5% methanol was used. In the first stage of reaction, a 20% aqueous solution of methanol prepared by adding 48.4 g of water to 12.2 g of 99.5% methanol was added to the aqueous solution of chromic acid using a metering pump at a rate of 1.0 g/min. This rate of addition allows 60.6 g of the 20% aqueous solution of methanol to be added in about one hour. Also note that 12.2 g of 99.5% methanol corresponds to a volume that reduces 30% of the chromic acid.

After the addition of the reducing agent was completed in the first stage, 554.8 g of a mixed solution of 28.4 g of 99.5% methanol and 526.4 g of 35% hydrochloric acid was added thereto at a rate of 4.6 g/min. This rate of addition allows 554.8 g of the mixed solution of methanol and hydrochloric acid to be added in 2 hours. During the reaction, 64.6 g of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and the aqueous solution of methanol was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 5

| | |
|---|---|
| $Cr(OH)Cl_2$ | 36.0% |
| Cr | 13.4% |
| Cl | 18.2% |
| Cl/Cr molar ration | 1.99 |
| Specific granity | 1.43 |
| $Cr^{6+}$ | Not detected |
| Oxalic acid(relative to Cr) | Not detected |
| TOC(relative to Cr) | 1.2% |
| Fe | 6 ppm |
| Na | 21 ppm |
| Cu | Not detected |

Example 1-6

To a glass reactor equipped with a condenser, 420.6 g of a liquid chromic acid 60% solution and 84.1 g of water were fed, followed by thorough stirring, to prepare a 50% aqueous solution of chromic acid. As a reducing agent, 99.5% methanol was used. In the first stage of reaction, a 20% aqueous solution of methanol prepared by adding 48.4 g of water to 12.2 g of 99.5% methanol was added to the aqueous solution of chromic acid using a metering pump at a rate of 1.0 g/min. This rate of addition allows 60.6 g of the 20% aqueous solution of methanol to be added in about one hour. Also note that 12.2 g of 99.5% methanol corresponds to a volume that reduces 30% of the chromic acid.

After the addition of the reducing agent was completed in the first stage, 686.4 g of a mixed solution of 28.4 g of 99.5% methanol and 658.0 g of 35% hydrochloric acid was added thereto at a rate of 5.7 g/min. This rate of addition allows 686.4 g of the mixed solution of methanol and hydrochloric acid to be added in 2 hours. During the reaction, 196.2 g of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and an aqueous solution of ethylene glycol was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 6

| | |
|---|---|
| $Cr(OH)_{0.5}Cl_{2.5}$ | 38.3% |
| Cr | 13.4% |
| Cl | 22.5% |
| Cl/Cr molar ration | 2.47 |
| Specific granity | 1.43 |
| $Cr^{6+}$ | Not detected |
| Oxalic acid(relative to Cr) | Not detected |
| TOC(relative to Cr) | 0.9% |
| Fe | 4 ppm |
| Na | 23 ppm |
| Cu | Not detected |

Example 1-7

To a glass reaction vessel equipped with a condenser, 105.2 kg of a 60% aqueous solution of chromic acid and 21.0 kg of water were fed, followed by thorough stirring, to prepare a 50% aqueous solution of chromic acid. As a reducing agent, methanol was used. In the first stage of reaction, a 20% aqueous solution of methanol prepared by adding 12.0 kg of water to 3.0 kg of 99.5% methanol was added to the aqueous solution of chromic acid using a metering pump at a rate of 0.25 kg/min. This rate of addition allows 15.0 kg of the 20% aqueous solution of methanol to be added in about one hour. Also note that 3.0 kg of 99.5% methanol corresponds to a volume that reduces 30% of the chromic acid.

After the addition of the reducing agent was completed in the first stage, 204.5 kg of a mixed solution of 7.1 kg of 99.5% methanol and 197.4 kg of 35% hydrochloric acid was added thereto at a rate of 1.70 kg/min. This rate of addition allows 204.5 kg of the mixed solution of methanol and hydrochloric acid to be added in 2 hours. During the reaction, 114.4 kg of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and an aqueous solution of ethylene glycol was added. Aging was further continued. Disappearance of color of $Cr^{6+}$ was confirmed by the diphenylcarbazide method, and thus the reaction was considered to be complete. During the reaction, generation of chromyl chloride was not observed. After the completion of reaction, the reaction solution was cooled to room temperature, and stirring was continued overnight. The precipitated crystals were separated with a centrifugal separator, and 61 kg of crystals of chromium chloride was recovered. The resulting crystals were confirmed to be $CrCl_3 \cdot 6H_2O$ by X-ray diffraction analysis. The composition of the resulting crystals of chromium chloride was as shown below.

TABLE 7

| | |
|---|---|
| $CrCl_3 \cdot 6H_2O$ | 97.8% |
| Cr | 19.1% |
| Cl | 39.0% |
| Cl/Cr molar ration | 3.00 |
| $Cr^{6+}$ | Not detected |
| Oxalic acid(relative to Cr) | Not detected |
| TOC(relative to Cr) | 0.1% |
| Fe | 15 ppm |
| Cu | Not detected |

Comparative Example 1-1

To a glass reactor equipped with a condenser, 251.6 g of water was fed and 253.1 g of chromium trioxide was further added thereto, followed by thorough stirring for dissolution, to prepare a 50% aqueous solution of chromic acid. Glucose was used as a reducing agent. In the first stage of reaction, a 20% aqueous solution of glucose prepared by adding 67.6 g of water to 17.6 g of 97% glucose was added to the aqueous solution of chromic acid using a metering pump at a rate of 1.4 g/min. This rate of addition allows 85.2 g of the 20% aqueous solution of glucose to be added in about one hour. Also note that 17.6 g of 97% glucose corresponds to a volume that reduces 30% of the chromic acid.

After the addition of the reducing agent was completed in the first stage, 830.5 g of a mixed solution of 41.0 g of 97% glucose and 789.5 g of 35% hydrochloric acid was added thereto at a rate of 6.9 g/min. This rate of addition allows 830.5 g of the mixed solution of glucose and hydrochloric acid to be added in 2 hours. During the reaction, 337.0 g of condensed water was extracted from the reaction system to perform concentration. After the addition of the mixed solution of the reducing agent and hydrochloric acid was completed, aging was continued for 30 minutes. The temperature in this process was 105° C. After aging, remaining $Cr^{6+}$ was checked, and an aqueous solution of glucose was added. Aging was further continued. Disappearance of color of $Cr^{6+}$ was confirmed by the diphenylcarbazide method, and thus the reaction was considered to be complete. During the reaction, generation of chromyl chloride was not observed. The composition of the resulting aqueous solution of chromium chloride was as shown below.

TABLE 8

| | |
|---|---|
| $CrCl_3$ | 40.4% |
| Cr | 13.3% |

TABLE 8-continued

| | |
|---|---|
| Cl | 27.0% |
| Cl/Cr molar ration | 2.99 |
| Specific granity | 1.45 |
| $Cr^{6+}$ | Not detected |
| Oxalic acid(relative to Cr) | 8.3% |
| TOC(relative to Cr) | 4.5% |
| Fe | 6 ppm |
| Na | 22 ppm |
| Cu | Not detected |

[Performance Evaluation]

Chromate treatment solutions were prepared using the respective aqueous solutions of chromium chloride obtained in Examples 1-1 to 1-6 and Comparative Example 1-1. Chromate treatment was performed by dipping a zinc-plated steel sheet test piece in each chromate treatment solution, followed by drying. The degree of gloss after the treatment was evaluated. The results thereof are shown in Table 9 below. In Table 9, ⊚ indicates very good gloss, ○ indicates good gloss, and x indicates poor gloss.

TABLE 9

| | Chromate treatment |
|---|---|
| Example 1-1 | ⊚ |
| Example 1-2 | ○ |
| Example 1-3 | ⊚ |
| Example 1-4 | ○ |
| Example 1-5 | ⊚ |
| Example 1-6 | ⊚ |
| Comparative Example 1-1 | X |

As is evident from the results shown in Table 9, when the aqueous solutions of chromium chloride (products of the present invention) of the examples are used, high gloss is achieved by the chromate treatment.

Furthermore, with respect to the aqueous solutions of chromium chloride obtained in Examples 1-4 and 1-5 and Comparative Example 1-1, occurrence of crystallization was evaluated. About 40 ml of each sample was placed in 50-ml plastic containers and the containers were covered with lids. The containers were left to stand either in an environment of room temperature or in an environment of minus zero degree or less. Then, the presence or absence of crystals was visually observed. With respect to the presence or absence of crystals, even microcrystals were considered as crystals because of the possibility that they would grow as nuclei. The results thereof are shown in Table 10.

TABLE 10

| | Environmental temperature | | | | | |
|---|---|---|---|---|---|---|
| | Room temperature | | | Minus 0° C. or less | | |
| Retention period | Example 1-4 | Example 1-5 | Comparative Example 1-1 | Example 1-4 | Example 1-5 | Comparative Example 1-1 |
| One month | Absent | Absent | Absent | Absent | Absent | Present |
| Three months | Absent | Absent | Absent | Absent | Absent | Present |
| One year | Absent | Absent | Absent | Absent | Absent | Present |

As is evident from Table 10, no crystals are observed in the solutions obtained in Examples 1-4 and 1-5 even if they are retained at minus zero degree or less. In contrast, crystals are observed in the solution obtained in Comparative Example 1-1, which is a typical example of an aqueous solution of chromium chloride having a conventional composition, if it is retained at near zero degree.

Example 2-1

To a glass reactor equipped with a condenser, 242.9 g of a 60% aqueous solution of chromic acid was fed, and 121.5 g of water and 571.4 g of 75% phosphoric acid were added thereto, followed by thorough stirring, to prepare a mixed aqueous solution of chromic acid and phosphoric acid. An aqueous solution of ethylene glycol, which had been separately prepared and diluted to 26% by adding 75.2 g of water to 27.5 g of 98.5% ethylene glycol in advance, was added to the mixed aqueous solution over 3 hours. Subsequently, aging was continued for 30 minutes. The temperature in this process was 108° C. After aging, remaining $Cr^{6+}$ was checked, and the aqueous solution of ethylene glycol was added. Aging was further continued. Disappearance of color of $Cr^{6+}$ was confirmed by the diphenylcarbazide method, and thus the reaction was considered to be complete. The composition of the resulting aqueous solution of chromium phosphate was as shown below.

TABLE 11

| | |
|---|---|
| $Cr(H_2PO_4)_3$ | 50.4% |
| $Cr^{6+}$ | Not detected |
| TOC(relative to Cr) | 0.5% |
| Oxalic acid(relative to Cr) | 0.1% |
| Fe | 5 ppm |
| Na | 20 ppm |
| Cl | 10 ppm |
| $SO_4$ | 45 ppm |

Example 2-2

To a glass reactor equipped with a condenser, 387.3 g of water was fed and 122.8 g of chromium trioxide was further added thereto, followed by thorough stirring for dissolution. Subsequently, 320.0 g of 75% phosphoric acid was added thereto to prepare a mixed aqueous solution of chromic acid and phosphoric acid. An aqueous solution of methanol, which had been separately prepared and diluted to 10% by adding 177.1 g of water to 19.7 g of 99.5% methanol in advance, was added to the mixed aqueous solution over 3 hours. Subsequently, aging was continued for 30 minutes. The temperature in this process was 108° C. After aging, remaining $Cr^{6+}$ was checked, and the aqueous solution of methanol was added. Aging was further continued. Disappearance of color of $Cr^{6+}$ was confirmed by the diphenylcarbazide method, and thus the reaction was considered to be complete. The composition of the resulting aqueous solution of chromium phosphate was as shown below.

TABLE 12

| | |
|---|---|
| $Cr(H_{1.5}PO_4)_2$ | 30.3% |
| $Cr^{6+}$ | Not detected |
| TOC(relative to Cr) | 1.6% |
| Oxalic acid(relative to Cr) | Not detected |
| Fe | 6 ppm |
| Na | 18 ppm |
| Cl | 10 ppm |
| $SO_4$ | 20 ppm |

Comparative Example 2-1

An aqueous solution of chromium phosphate was obtained as in Example 2-1 except that glucose was used instead of ethylene glycol that was used in Example 2-1. The composition of the resulting aqueous solution of chromium phosphate was as shown below.

TABLE 13

| | |
|---|---|
| $Cr(H_2PO_4)_3$ | 50.3% |
| $Cr^{6+}$ | Not detected |
| TOC(relative to Cr) | 3.9% |
| Oxalic acid(relative to Cr) | 9.2% |
| Fe | 4 ppm |
| Na | 22 ppm |
| Cl | 10 ppm |
| $SO_4$ | 30 ppm |

[Performance Evaluation]

Chromate treatment solutions were prepared using the respective aqueous solutions of chromium phosphate obtained in Examples 2-1 and 2-2 and Comparative Example 2-1. Chromate treatment was performed by dipping a zinc-plated steel sheet test piece in each chromate treatment solution, followed by drying. The results of evaluation of the degree of gloss after the treatment are shown in Table 14 below. In Table 14, ○ indicates good gloss and x indicates poor gloss.

TABLE 14

| | Chromate treatment |
|---|---|
| Example 2-1 | ○ |
| Example 2-2 | ○ |
| Comparative Example 2-1 | X |

As is evident from the results shown in Table 14, when the aqueous solutions of chromium phosphate (products of the present invention) of the examples are used, high gloss is achieved by the chromate treatment.

Example 3-1

To a glass reactor equipped with a condenser, 251.6 g of water was fed and 168.6 g of chromium trioxide was further added thereto, followed by thorough stirring for dissolution, to prepare a 40% aqueous solution of chromic acid. As a reducing agent, an 18% aqueous solution of methanol prepared by adding 119.2 g of water to 27.0 g of 99.5% methanol was used. The aqueous solution of methanol was added to the aqueous solution of chromic acid using a metering pump at a rate of 1.22 g/min. This rate of addition allows 146.2 g of the 18% aqueous solution of methanol to be added in two hours.

Twelve minutes after the start of addition of the aqueous solution of methanol, 470.6 g of a 67.5% aqueous solution of nitric acid was added separately from the aqueous solution of methanol at a rate of 3.92 g/min. This rate of addition allows the aqueous solution of nitric acid to be added in two hours, the same as the time of addition of the aqueous solution of methanol. After the addition of the aqueous solution of methanol was completed, the ratio a/b of the theoretical amount a of nitric acid to the theoretical amount b of methanol was 0.9. Twelve minutes after the addition of the aqueous solution of methanol was completed, the addition of the aqueous solution of nitric acid was also completed. Subsequently, aging was continued for 30 minutes. The temperature in this process was 105° C. After aging, remaining $Cr^{6+}$ was checked, and the aqueous solution of methanol was added. Aging was further continued. Disappearance of color of $Cr^{6+}$ was confirmed by the diphenylcarbazide method, and thus the reaction was considered to be complete. During the reaction, generation of nitrous acid gas was not observed. The composition of the resulting aqueous solution of chromium nitrate was as shown below.

TABLE 15

| | |
|---|---|
| $Cr(NO_3)_3$ | 40.5% |
| Cr | 8.9% |
| $NO_3$ | 31.66% |
| $NO_3$/Cr molar ration | 3.00 |
| $Cr^{6+}$ | Not detected |
| Oxalic acid(relative to Cr) | Not detected |
| TOC(relative to Cr) | 0.1% |
| Fe | 4 ppm |
| Na | 12 ppm |
| Ca | 2 ppm |
| Mg | Not detected |
| Si | Not detected |
| Al | Not detected |
| Cu | Not detected |
| Ni | Not detected |

Example 3-2

To a glass reactor equipped with a condenser, 280.2 g of a 60% aqueous solution of chromic acid and 140.0 g of water were fed, followed by thorough stirring, to prepare a 40% aqueous solution of chromic acid. As a reducing agent, a 20% aqueous solution of ethylene glycol prepared by adding 121.9 g of water to 31.7 g of 98.5% ethylene glycol was used. The aqueous solution of ethylene glycol was added to the aqueous solution of chromic acid using a metering pump at a rate of 1.28 g/min. This rate of addition allows 153.6 g of the 20% aqueous solution of ethylene glycol to be added in two hours.

Twelve minutes after the start of addition of the aqueous solution of ethylene glycol, 470.6 g of a 67.5% aqueous solution of nitric acid was added separately from the aqueous solution of ethylene glycol at a rate of 3.92 g/min. This rate of addition allows the aqueous solution of nitric acid to be added in two hours, the same as the time of addition of the aqueous solution of ethylene glycol. After the addition of the aqueous solution of ethylene glycol was completed, the ratio a/b of the theoretical amount a of nitric acid to the theoretical amount b of ethylene glycol was 0.9. Twelve minutes after the addition of the aqueous solution of ethylene glycol was completed, the addition of the aqueous solution of nitric acid was also completed. Subsequently, aging was continued for 30 minutes. The temperature in this process was 105° C. After aging, remaining $Cr^{6+}$ was checked, and the aqueous solution of ethylene glycol was added. Aging was further continued. Disappearance of color of $Cr^{6+}$ was confirmed by the diphenylcarbazide method, and thus the reaction was considered to be complete. During the reaction, generation of nitrous acid gas was not observed. The composition of the resulting aqueous solution of chromium nitrate was as shown below.

TABLE 16

| | |
|---|---|
| $Cr(NO_3)_3$ | 40.6% |
| Cr | 8.87% |
| $NO_3$ | 31.62% |
| $NO_3$/Cr molar ration | 2.99 |
| $Cr^{6+}$ | Not detected |
| Oxalic acid(relative to Cr) | 1.1% |
| TOC(relative to Cr) | 0.2% |
| Fe | 5 ppm |
| Na | 16 ppm |

TABLE 16-continued

| | |
|---|---|
| Ca | 2 ppm |
| Mg | Not detected |
| Si | Not detected |
| Al | Not detected |
| Cu | Not detected |
| Ni | Not detected |

Example 3-3

To a glass reaction vessel equipped with a condenser, 70.0 kg of a 60% aqueous solution of chromic acid and 35.0 kg of water were fed, followed by thorough stirring, to prepare a 40% aqueous solution of chromic acid. As a reducing agent, an 18% aqueous solution of methanol prepared by adding 29.9 kg of water to 6.8 kg of 99.5% methanol was used. The aqueous solution of methanol was added to the aqueous solution of chromic acid using a metering pump at a rate of 306 g/min. This rate of addition allows 36.7 kg of the 18% aqueous solution of methanol to be added in two hours.

Twelve minutes after the start of addition of the aqueous solution of methanol, 117.6 kg of a 67.5% aqueous solution of nitric acid was added separately from the aqueous solution of methanol at a rate of 980 g/min. This rate of addition allows the aqueous solution of nitric acid to be added in two hours, the same as the time of addition of the aqueous solution of methanol. After the addition of the aqueous solution of methanol was completed, the ratio a/b of the theoretical amount a of nitric acid to the theoretical amount b of methanol was 0.9. Twelve minutes after the addition of the aqueous solution of methanol was completed, the addition of the aqueous solution of nitric acid was also completed. Subsequently, aging was continued for 30 minutes. The temperature in this process was 105° C. After aging, remaining $Cr^{6+}$ was checked, and the aqueous solution of methanol was added. Aging was further continued. Disappearance of color of $Cr^{6+}$ was confirmed by the diphenylcarbazide method, and thus the reaction was considered to be complete. During the reaction, 50 kg of condensed water was extracted from the lower part of the condenser to perform concentration. After the completion of reaction, the reaction solution was cooled to room temperature, seed crystals were added thereto, and stirring was continued day and overnight. The precipitated crystals were separated with a centrifugal separator, and 25 kg of crystals of chromium nitrate was recovered. The resulting crystals were confirmed to be $Cr(NO_3)_3 \cdot 9H_2O$ by x-ray diffraction analysis. The composition of the resulting crystals of chromium nitrate was as shown below.

TABLE 17

| | |
|---|---|
| $Cr(NO_3)_3 \cdot 9H_2O$ | 98.90% |
| Cr | 12.86% |
| $NO_3$ | 46.15% |
| $NO_3$/Cr molar ration | 3.01 |
| $Cr^{6+}$ | Not detected |
| Oxalic acid(relative to Cr) | 1.10% |
| TOC(relative to Cr) | 0.10% |
| Fe | 30 ppm |
| Na | 8 ppm |
| Ca | 2 ppm |
| Mg | Not detected |
| Si | Not detected |
| Al | Not detected |
| Cu | Not detected |
| Ni | Not detected |

Example 3-4

To a glass reactor equipped with a condenser, 280.2 g of a 60% aqueous solution of chromic acid and 280.2 g of water were fed, followed by thorough stirring, to prepare a 30% aqueous solution of chromic acid. As a reducing agent, a 34% aqueous solution of ethylene glycol prepared by adding 60.2 g of water to 31.7 g of 98.5% ethylene glycol was used. The aqueous solution of ethylene glycol was added to the aqueous solution of chromic acid using a metering pump at a rate of 0.77 g/min. This rate of addition allows 91.9 g of the 34% aqueous solution of ethylene glycol to be added in two hours.

Twelve minutes after the start of addition of the aqueous solution of ethylene glycol, 392.2 g of 67.5% nitric acid was added separately from the aqueous solution of ethylene glycol at a rate of 3.27 g/min. This rate of addition allows the nitric acid to be added in two hours, the same as the time of addition of the aqueous solution of ethylene glycol. After the addition of the aqueous solution of ethylene glycol was completed, the ratio a/b of the theoretical amount a of nitric acid to the theoretical amount b of ethylene glycol was 0.9. Twelve minutes after the addition of the aqueous solution of ethylene glycol was completed, the addition of nitric acid was also completed. Subsequently, aging was continued for 30 minutes. The temperature in this process was 105° C. After aging, remaining $Cr^{6+}$ was checked, and the aqueous solution of ethylene glycol was added. Aging was further continued. Disappearance of color of $Cr^{6+}$ was confirmed by the diphenylcarbazide method, and thus the reaction was considered to be complete. During the reaction, generation of nitrous acid gas was not observed. The composition of the resulting aqueous solution of chromium nitrate was as shown below.

TABLE 18

| | |
|---|---|
| $Cr(OH)_{0.5}(NO_3)_{2.5}$ | 36.50% |
| Cr | 8.81% |
| $NO_3$ | 26.37% |
| $NO_3$/Cr molar ration | 2.51 |
| $Cr^{6+}$ | Not detected |
| Oxalic acid(relative to Cr) | 4.50% |
| TOC(relative to Cr) | 1.00% |
| Fe | 7 ppm |
| Na | 15 ppm |
| Ca | 4 ppm |
| Mg | Not detected |
| Si | Not detected |
| Al | Not detected |
| Cu | Not detected |
| Ni | Not detected |

Comparative Example 3-1

To a glass reactor equipped with a condenser, 251.6 g of water was fed and 168.6 g of chromium trioxide was further added thereto, followed by thorough stirring for dissolution, to prepare a 40% aqueous solution of chromic acid. As a reducing agent, a 26% aqueous solution of glucose prepared by adding 107.2 g of water to 39.0 g of 97% glucose was used. The aqueous solution of glucose was added to the aqueous solution of chromic acid using a metering pump at a rate of 1.22 g/min. This rate of addition allows 146.2 g of the 26% aqueous solution of glucose to be added in two hours.

Twelve minutes after the start of addition of the aqueous solution of glucose, 470.6 g of a 67.5% aqueous solution of nitric acid was added separately from the aqueous solution of glucose at a rate of 3.92 g/min. This rate of addition allows the aqueous solution of nitric acid to be added in two hours, the same as the time of addition of the aqueous solution of glucose. After the addition of the aqueous solution of glucose was completed, the ratio a/b of the theoretical amount a of nitric acid to the theoretical amount b of glucose was 0.9. Twelve minutes after the addition of the aqueous solution of glucose was completed, the addition of the aqueous solution of nitric acid was also completed. Subsequently, aging was continued for 30 minutes. The temperature in this process was 105° C. After aging, remaining $Cr^{6+}$ was checked, and the aqueous solution of glucose was added. Aging was further continued. Disappearance of color of $Cr^{6+}$ was confirmed by the diphenylcarbazide method, and thus the reaction was considered to be complete. During the reaction, generation of nitrous acid gas was not observed. The composition of the resulting aqueous solution of chromium nitrate was as shown below.

TABLE 19

| | |
|---|---|
| $Cr(NO_3)_3$ | 40.40% |
| Cr | 8.83% |
| $NO_3$ | 31.58% |
| $NO_3$/Cr molar ration | 3 |
| $Cr^{6+}$ | Not detected |
| Oxalic acid(relative to Cr) | 9% |
| TOC(relative to Cr) | 2.20% |
| Fe | 5 ppm |
| Na | 12 ppm |
| Ca | 3 ppm |
| Mg | Not detected |
| Si | Not detected |
| Al | Not detected |
| Cu | Not detected |
| Ni | Not detected |

[Performance Evaluation]

Chromate treatment solutions were prepared using the respective aqueous solutions of chromium nitrate obtained in Examples 3-1, 3-2, and 3-4 and Comparative Example 3-1. Chromate treatment was performed by dipping a zinc-plated steel sheet test piece in each chromate treatment solution, followed by drying. The degree of gloss after the treatment was evaluated. The results thereof are shown in Table 20 below. In Table 20, ⊚ indicates very good gloss, ○ indicates good gloss, and x indicates poor gloss.

TABLE 20

| | Chromate treatment |
|---|---|
| Example 3-1 | ⊚ |
| Example 3-2 | ⊚ |
| Example 3-4 | ○ |
| Comparative Example 3-1 | X |

As is evident from the results shown in Table 20, when the aqueous solutions of chromium nitrate (products of the present invention) of the examples are used, high gloss is achieved by the chromate treatment.

INDUSTRIAL APPLICABILITY

The aqueous solution of a chromium salt of the present invention contains a very small amount of oxalic acid, and when surface treatment of metal is carried out using the aqueous solution, a product with a highly glossy finish can be obtained. Furthermore, according to the production method of the present invention, it is possible to industrially advantageously produce an aqueous solution of a chromium salt in which the oxalic acid content is extremely low.

The invention claimed is:

1. An aqueous solution of a chromium salt comprising:
   an oxalic acid content of 8% by weight or less relative to chromium,
   wherein the chromium salt is a chromium chloride,
   wherein the aqueous solution contains a basic chromium chloride represented by the composition formula $Cr(OH)_xCl_y$ (wherein $0<x\leqq2$, $1\leqq y<3$, and $x+y=3$);
   wherein a total organic carbon content in the aqueous solution of the chromium salt is 0.5 to 4% by weight;
   wherein the aqueous solution of the chromium salt is produced by a process comprising the steps of:
   adding an organic reducing agent composed of a monohydric alcohol or a dihydric alcohol to an aqueous solution of chromic acid to reduce part of a chromic acid in advance in a first stage of reaction;
   mixing hydrochloric acid and the organic reducing agent to form a mixture; and
   adding the mixture to the aqueous solution of chromic acid so as to complete the reaction.

2. The aqueous solution of the chromium salt according to claim 1, wherein a specific gravity at 2000 is 1.35 to 1.44, and a molar ratio (Cl/Cr) of chlorine to chromium is 1 or more and less than 3.

3. The aqueous solution of the chromium salt according to claim 1, wherein a concentration in terms of Cr is 8.2% to 14% by weight.

4. A method for producing an aqueous solution of a chromium salt including an oxalic acid content of 8% by weight or less relative to chromium, wherein the chromium salt is a chromium chloride, and the aqueous solution contains a basic chromium chloride represented by the composition formula $Cr(OH)_xCl_y$ (wherein $0<x\leqq2$, $1\leqq y<3$, and $x+y=3$), comprising the steps of:
   adding an organic reducing agent composed of a monohydric alcohol or a dihydric alcohol to an aqueous solution of chromic acid to reduce part of a chromic acid in advance in a first stage of reaction;
   mixing hydrochloric acid and the organic reducing agent to form a mixture; and
   adding the mixture to the aqueous solution of chromic acid so as to complete the reaction.

5. The method for producing an aqueous solution of a chromium salt according to claim 4, wherein said step of adding the mixture to the aqueous solution of chromic acid so as to complete the reaction includes obtaining the aqueous solution having a specific gravity at 20° C. which is 1.35 to 1.44, and a molar ratio (Cl/Cr) of chlorine to chromium which is 1 or more and less than 3.

6. The method for producing an aqueous solution of a chromium salt according to claim 4, wherein said step of adding the mixture to the aqueous solution of chromic acid so as to complete the reaction includes obtaining the aqueous solution having a concentration in terms of Cr which is 8.2% to 14% by weight.

* * * * *

UNITED STATES PATENT AND TRADEMARK OFFICE
CERTIFICATE OF CORRECTION

PATENT NO. : 7,641,721 B2  Page 1 of 1
APPLICATION NO. : 10/578626
DATED : January 5, 2010
INVENTOR(S) : Kotaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 584 days.

Signed and Sealed this

Eighteenth Day of January, 2011

David J. Kappos
*Director of the United States Patent and Trademark Office*